J. D. COWARD.
TRAFFIC SIGNAL.
APPLICATION FILED JAN. 19, 1920.

1,422,179.

Patented July 11, 1922.

Inventor:
John D. Coward,
By his attorney
Charles H. Gooding.

UNITED STATES PATENT OFFICE.

JOHN D. COWARD, OF NEWTON UPPER FALLS, MASSACHUSETTS.

TRAFFIC SIGNAL.

1,422,179.   Specification of Letters Patent.   Patented July 11, 1922.

Application filed January 19, 1920. Serial No. 352,272.

*To all whom it may concern:*

Be it known that I, JOHN D. COWARD, a citizen of the United States, residing at Newton Upper Falls, in the county of Middlesex and State of Massachusetts, have invented new and useful Improvements in Traffic Signals, of which the following is a specification.

This invention relates to a traffic signal for use on vehicles, especially on automobiles.

It is very essential that devices of this character should be simple, easily operated by the driver of the automobile and when so operated be clearly visible to traffic officers or pedestrians or occupants of approaching automobiles and also to the operator of the automobile to which the traffic signal is attached, in order to indicate to them the direction in which the automobile to which the device is attached is about to proceed.

To these ends the invention consists of a direction indicator rotatably mounted upon a support which is positioned at the rear of and in close proximity to the windshield of the automobile and which projects laterally of said support to a substantial distance beyond said support so that said indicator may be visible through the windshield by traffic officers, pedestrians or people in approaching automobiles and also be visible to the operator of the automobile upon which it is placed and, further, may be quickly and easily operated by said operator from the rear of the windshield.

The invention further consists in the combination and arrangement of parts set forth in the following specification and particularly pointed out in the claims thereof.

Referring to the drawings.

Like numerals refer to like parts throughout the several views of the drawings.

Figure 1:
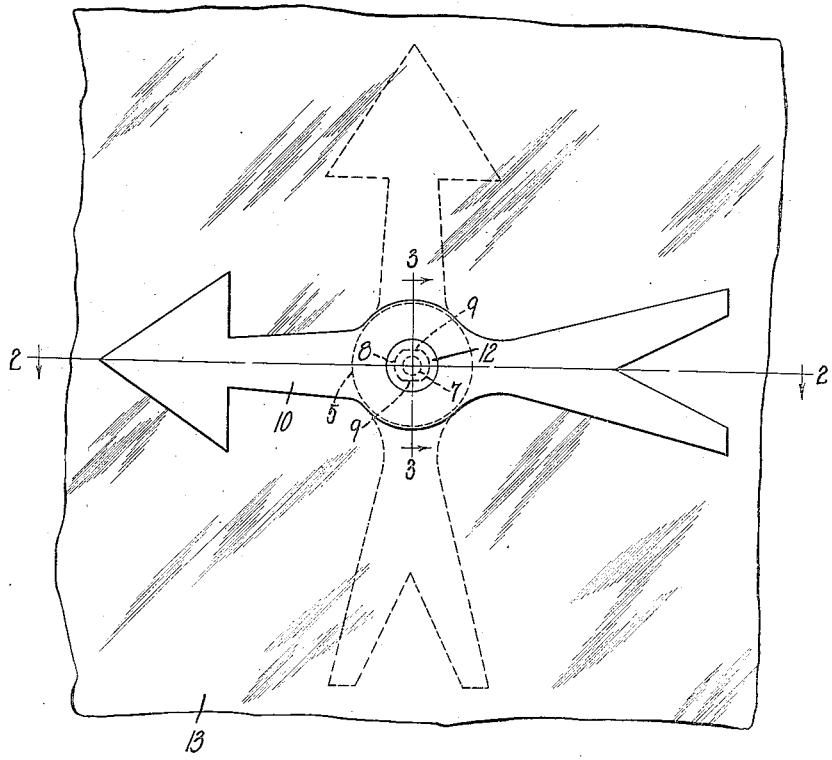
Figure 1 is a front elevation of a traffic signal embodying my invention, the same being illustrated attached to a pane of glass.
Figure 2:
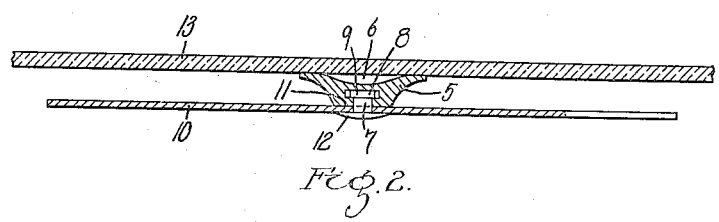
Fig. 2 is a horizontal section taken on the line 2—2 of Figure 1.
Figure 3:
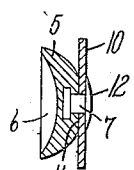
Fig. 3 is a vertical section taken on the line 3—3 of Fig. 1 illustrating the suction member in the position it assumes before being attached to the pane of glass.

In the drawings, referring particularly to Figures 1 to 3, 5 represents an indicator support preferably consisting of a suction member constructed of resilient material such as rubber and provided with a cup-shaped recess 6 in one side thereof. A stud 7 preferably formed of soft metal capable of being easily riveted, is securely fastened in the suction member 5, a head 8 of said stud being embedded therein to prevent said stud from being withdrawn therefrom. Opposite sides of the head 8 are flattened at 9 to prevent the stud from turning within suction member 5.

Rotatably mounted upon the stud 7 is a direction indicator 10 suitably formed of sheet material and projecting laterally of said indicator support a substantial distance therebeyond. The indicator 10 has frictional engagement with a flat surface 11 provided on the suction member 5 and is secured upon the stud 7 and held against the flat surface 11 by riveting a flange 12 upon the outer end of the stud 7. There is just enough friction between the indicator 10 and the portions of the suction member and stud contacting therewith to allow said indicator to be easily rotated by pushing the same with the finger yet at the same time hold said indicator firmly at any position at which it may be placed without being influenced by any jarring movements of the vehicle.

The device is intended to be attached to a transparent windshield 13 located at the front of an automobile, where it may be visible to traffic officers, pedestrians and other automobilists through said windshield. It is attached preferably by first moistening the surface of the cup-shaped recess 6 and then forcing the suction member against the member 13 with sufficient pressure to flatten out the underside of said suction member and then releasing said pressure, whereupon the central portion of said suction member will draw away slightly from the member 13 thereby creating a vacuum in the recess 6 between the suction member 5 and the member 13 with the result that the suction member 5 will adhere tightly to the member 13. When thus positioned the device is operated as follows: If it is intended to proceed in a straight course ahead, the indicator is turned to the position illustrated in dotted lines Figure 1. If it is intended to move backward, the indicator is moved to a position opposite to that illustrated in dotted lines in Fig. 1. If it is intended to turn either to the left or to the right, the indicator is turned to the position illustrated in full lines Figure 1 or to a position opposite to said full line position. This will indicate to other automobilists, pedestrians or traffic officers the direction in which it is intended to direct the course of the automobile with the result that all persons interested will have a clearer understanding of the intents and purposes of the other.

Figure 4:
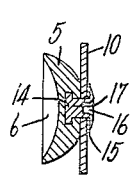
Fig. 4 is a vertical section similar to Fig. 3 but illustrating a modified embodiment of my invention.

In Figure 4 is illustrated a modified embodiment of my invention in which a suction member 5 has securely fastened therein a stud 17 provided with a head 14 which is embedded in said suction member. The indicator 10 is rotatably mounted upon the stud 13 between the suction member 5 and a washer 15 which is also mounted upon the stud 13. The outer end of the stud 13 is provided with a recess 16, the walls of which are spread and clenched over the washer 15 and the indicator is securely fastened between the suction member and the washer and has frictional engagement with each. The embodiment of my invention is operated in a manner similar to the device illustrated in Figures 1 to 3 inclusive.

Having thus described my invention what I claim and desire by Letters Patent to secure is:

1. A traffic signal for automobiles having, in combination, a transparent windshield, an indicator support positioned upon the rear of said windshield and a direction indicator of a length greater than its width rotatably mounted upon said support and projecting laterally of said support a substantial distance therebeyond, whereby said indicator may be visible through said windshield and visible and manually operable from the rear of said windshield.

2. A traffic signal for automobiles having, in combination, a transparent windshield, a suction member constituting an indicator support positioned upon the rear of said windshield and a direction indicator of a length greater than its width rotatably mounted upon said support and projecting laterally of said support a substantial distance therebeyond, whereby said indicator may be visible through said windshield and visible and manually operable from the rear of said windshield.

3. A traffic signal for automobiles having, in combination, a transparent windshield, an indicator support positioned upon the rear of said windshield and a direction indicator of a length substantially greater than its width rotatably mounted upon said support about an axis substantially normal to said windshield, said indicator projecting laterally of said support a substantial distance therebeyond whereby the same may be visible through said windshield and visible and manually operable from the rear of said windshield.

4. A traffic signal for automombiles having, in combination, a transparent windshield, a suction member constituting an indicator support positioned upon the rear of said windshield and a direction indicator of a length substantially greater than its width rotatably mounted upon said suction member about an axis substantially normal to said windshield, said indicator projecting at its opposite ends laterally of said support and a substantial distance therebeyond, whereby the same may be visible through said windshield and visible and manually operable from the rear of said windshield.

5. A traffic signal for automobiles having, in combination, an indicator support adapted to be adhesively positioned upon the transparent member of an automobile windshield and a direction indicator of a length substantially greater than its width rotatably mounted upon said support and projecting laterally of said support a substantial distance therebeyond whereby when said indicator support is positioned upon said windshield, said indicator may be visible through said windshield and visible and manually operable from the rear of said windshield.

6. A traffic signal for automobiles having, in combination, a suction member constituting an indicator support adapted to be adhesively positioned upon the transparent member of an automobile windshield and a direction indicator of a length substantially greater than its width rotatably mounted upon said support and projecting laterally of said support a substantial distance therebeyond, whereby when said support is positioned upon an automobile windshield said indicator may be visible through said windshield and visible and manually operable from the rear of said windshield.

7. A traffic signal for automobiles having, in combination, an indicator support adapted to be adhesively positioned upon the transparent member of an automobile windshield and a direction indicator of a length substantially greater than its width rotatably mounted upon said support about an axis which, when said indicator support shall be positioned upon said windshield, will be normal to said windshield, said indicator projecting laterally of said support a substantial distance therebeyond, whereby when said support is attached to a windshield the same may be visible through said windshield and visible and manually operable from the rear of said windshield.

8. A traffic signal for automobiles having, in combination, a suction member constituting an indicator support adapted to be adhesively positioned upon the transparent member of an automobile windshield and a direction indicator of a length substantially greater than its width rotatably mounted upon said suction member about an axis which is substantially normal to said windshield when said suction member is attached thereto, said indicator projecting at its opposite ends laterally of said support and a substantial distance therebeyond, whereby the same may be visible through said windshield and visible and manually operable from the rear of said windshield.

In testimony whereof I have hereunto set my hand in presence of two subscribing witnesses.

JOHN D. COWARD.

Witnesses:
 FRANKLIN E. LOW,
 CATHERINE M. JOYCE.